No. 629,474. Patented July 25, 1899.
W. SECKLER.
ROTARY HARROW.
(Application filed May 11, 1898.)
(No Model.)
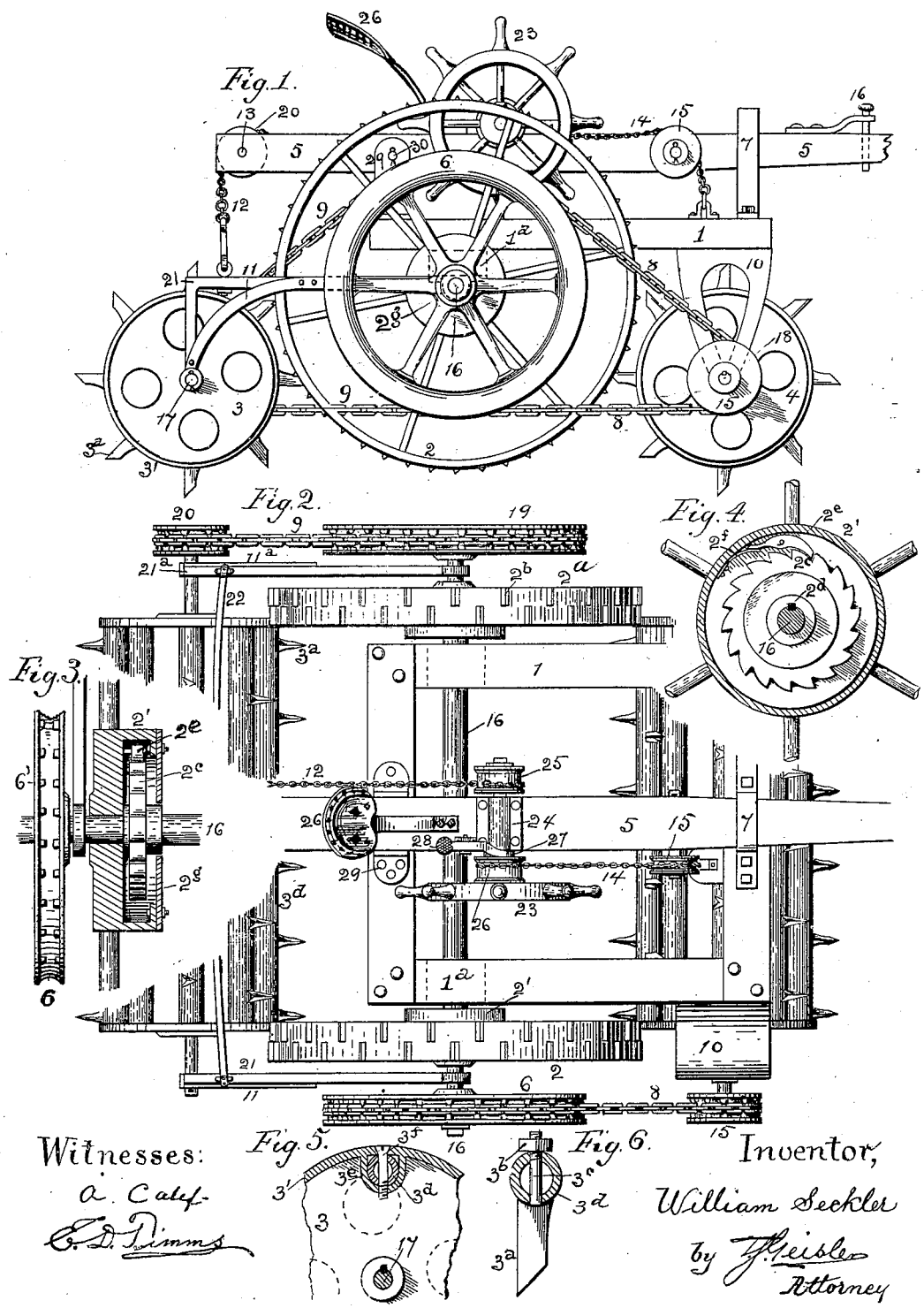
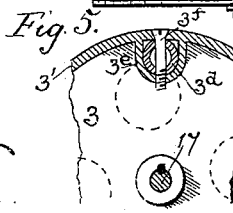
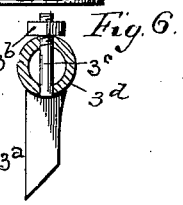
Witnesses:
A. Calef
E. D. Timms
Inventor,
William Seckler
by J. Geisler
Attorney

UNITED STATES PATENT OFFICE.

WILLIAM SECKLER, OF CORVALLIS, OREGON.

ROTARY HARROW.

SPECIFICATION forming part of Letters Patent No. 629,474, dated July 25, 1899.

Application filed May 11, 1898. Serial No. 680,389. (No model.)

*To all whom it may concern:*

Be it known that I, WILLIAM SECKLER, a citizen of the United States of America, and a resident of Corvallis, in the county of Benton and State of Oregon, have invented certain new and useful Improvements in Rotary Harrows, of which the following is a specification, reference being had to the accompanying drawings as a part thereof.

My invention relates to rotary harrows; and the objects of my improvement are to perfect the general structure of such harrows, to arrange all the coöperating parts to work to their best advantage, and to place the operation of such harrows within the complete control of the driver thereof, and these improvements are embodied in the accompanying drawings, in which—

Figure 1 is a side elevation of my improved harrow. Fig. 2 is a partial plan of the same, and Figs. 3, 4, 5, and 6 are details of construction which will be more fully explained in the description of my invention.

The numerals designate the parts referred to.

My invention comprises a small frame 1, supported on two broad wheels 2 2ª, on which my harrow travels, the periphery of such wheels being provided with ribs 2ᵇ to enable the same to take a firm hold of the ground, which is necessary, as the power for revolving the toothed rollers 3 4 is obtained from said driving-wheels. The boxes 1ª for the driving-wheels are made fast to the side timbers of the frame. The said driving-wheels are loosely mounted on the axle 16, but adapted to engage the axle and rotate the same on moving forward. For this purpose the hubs of said wheels on their inner sides are provided with a peripheral flange 2′ and plate-cover 2ᵍ, forming a box for such hub-engaging mechanism to work in, which mechanism consists of a ratchet-wheel 2ᶜ, made fast on the axle 16 by a key 2ᵈ, a pawl 2ᵉ, and a spring 2ᶠ, pivotally secured on said flange or rim 2ʳ of said wheel-box, such pawl engaging the ratchet-wheel, and thereby driving the axle when the driving-wheels or either thereof revolve forward, but allowing free backward rotation to either wheel to facilitate turning and backing. A detail of such construction is shown in Figs. 3 and 4. Outside of the driving-wheel, on the right side of my machine, there is fixedly mounted on the axle 16 a chain-wheel 6, from which runs a chain 8 for driving or rotating the forward cylindrical harrow or toothed roller 4, the axle 18 of which harrow has a smaller chain-wheel 15, over which said chain runs, the chain-wheel 15 being proportioned in size to the larger chain-wheel, with which it is connected, so as to give the rotary harrow a sufficient number of revolutions, and outside of the driving-wheel, on the left side of my machine, there is fixedly mounted on the said axle a second chain-wheel 19, from which runs a chain 9 for driving the rearward cylindrical harrow or toothed roller 3, the axle 17 of which is also provided with a small chain-wheel. The axle 18 for the forward toothed roller 4 is journaled in boxes 10, depending from the forward end of the frame 1, so that such roller 4 will rise and drop with said frame. The axle 17 of the rearward roller 3 is journaled in boxes therefor provided on a frame hung from the main axle 16 and comprising the arms 21 21ª, the inner ends of which have eyes fitting on the axle 16, the braces 11 11ª for strengthening the outer extremities of said arms, and the transverse brace 22. An eye is affixed to the center of the last-named brace, and a chain 12, attached thereto, which chain runs over a pulley 20, secured by a pin 13 to the rear end of the pole 5. Said pole is pivotally supported by a pin 30, passing transversely therethrough and resting in boxes 29.

A windlass-gear, comprising a short shaft, drums 25 26, spoke-wheel 23, ratchet-wheel mounted on said shaft, and foot-pawl 27, is mounted on the pole in a box 24, and the chain 12, attached to the frame, in which the rearward roller is supported, is also attached to the drum 25, as shown, so that by turning the spoke-wheel back the said drum will wind up said chain and lift the roller B off the ground, as may be necessary when turning to one side or passing an obstruction. The other drum 26 has attached to it a chain 14, running over a pulley 15, secured to the pole like the pulley 20, the other end of which chain is fixed to an eye in the forward end of the frame 1. Thus the same manipulation of the windlass that will lift the roller 3 off the ground will also lift the roller 4 and suspend both of such rollers from the pole, the said windlass being operated by the driver seated on the seat 26, who grasps the spoke-wheel 23 with one hand and controls the pawl 27 by pressing on the toe-piece 28 of the arm of such pawl, which is so pivoted that it is normally in engagement with the ratchet on the shaft of the windlass, out of which engagement it must be lifted by pressure of the foot.

The iron guide 7 is provided to prevent too great a strain being brought to bear upon the pivoted end of the pole when turning. The doubletrees are attached to the pole by a pin 16. The construction of the two toothed rollers 3 4 is alike, so that a single description will answer for both. Referring for convenience to the rearward roller 3 and to Figs. 5 and 6 as illustrating the details of the construction thereof, the same comprises two circular disks, each having a wide flange 3′, projecting inwardly on its periphery and formed integrally therewith. A series of sockets $3^e$ are provided on the inner surface of each disk, near its rim, and in such sockets are secured a series of tubes $3^d$, there being vertical perforations extending through such peripheral flange, the sockets $3^e$, and the ends of the tubes $3^d$, the base of the perforation in the tube being threaded to engage the thread of a screw $3^f$, inserted to secure said parts together.

The disks have a perforation for the axle 17 to extend through, a boss being formed around the said perforation and the axle made fast in said disks.

The tubes $3^d$ are provided with a series of perforations extending radially from the center of the axle and constituting sockets for holding the shanks $3^c$ of the teeth $3^a$. Such teeth in structure comprise two blades standing at an acute angle and meeting in front in a straight cutting edge, reduced at its lower extremity to a sharp point. The surfaces of said blades of the teeth abutting on the tubes $3^d$ are concaved to conform to the periphery of such tubes to better hold the teeth when fixed, which is done by a nut $3^b$. By this construction the said rollers are strongly made in all their parts without embodying unnecessary material and weight, and in case of breakage the injured parts can be readily substituted.

I am aware that rotary harrows have heretofore been constructed with means for lifting the revolving harrows off the ground; but I am not aware that such implements have embodied the specific devices contrived by me and by reason of which I obtain better work from my machine.

What I claim, therefore, is—

1. A harrow of the class specified, comprising a frame, axle-boxes under the rearward end of said frame, an axle therein, a pair of driving-wheels loosely mounted on such axle, and an automatic clutching device whereby either of said wheels, when rotating forward, will engage the axle and revolve the same, a pole mounted upon such frame, a toothed cylinder, the axle of which is journaled in bearings therefor provided, under the front end of said frame, a second toothed cylinder, the axle of which is journaled in a separate frame hung by its inner end from the main axle and rearwardly of the main frame, means for transmitting the forward rotation of the driving-wheels to the said toothed cylinders, to revolve the same, and means whereby the free end of the main frame and of the frame in which the rear toothed cylinder is journaled, may be lifted simultaneously up and therewith said toothed cylinders raised off the ground, substantially as described.

2. In an implement of the class specified, in combination with a vehicle-body and bearings, a cylindrical harrow, comprising two circular disks, a series of sockets, $3^e$ on the inner surface of each disk, a series of tubes, $3^d$ fixedly held by their ends in said sockets, and a series of teeth fixed in said tubes and projecting radially from the line of the axle of said disks, and means for driving said cylindrical harrow from the vehicle-wheels, substantially as described.

3. In an implement of the class specified, in combination with a vehicle-body and bearings, a cylindrical harrow, comprising two circular disks, a series of sockets, $3^e$, on the inner surface of each disk, a series of tubes, $3^d$, fixedly held by their ends in said sockets, and a series of teeth fixed in said tubes and projecting radially from the line of the axle of said disks, and means for driving said cylindrical harrow from the vehicle-wheels, said teeth in structure comprising two blades standing at an acute angle and meeting in front in a straight cutting edge reduced at its lower extremity to a point, the surfaces of said blades of the teeth abutting on the said tubes being concaved to conform to the periphery of such tubes, to better hold such teeth when fixed in the tubes, substantially as described.

In testimony whereof I have hereunto affixed my signature in the presence of two witnesses.

WILLIAM SECKLER.

Witnesses:
  M. A. OXER,
  E. G. LAMAN.